US012725825B2

(12) United States Patent
Wu et al.

(10) Patent No.: US 12,725,825 B2
(45) Date of Patent: Sep. 1, 2026

(54) STRIP DEFECT REPAIR DEVICE

(71) Applicant: CONTEMPORARY AMPEREX TECHNOLOGY (HONG KONG) LIMITED, Hong Kong (CN)

(72) Inventors: Zhifeng Wu, Ningde (CN); Chao Guo, Ningde (CN); Shaojun Qiu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 636 days.

(21) Appl. No.: 18/333,327

(22) Filed: Jun. 12, 2023

(65) Prior Publication Data

US 2023/0335776 A1 Oct. 19, 2023

Related U.S. Application Data

(63) Continuation of application No. PCT/CN2022/098229, filed on Jun. 10, 2022.

(30) Foreign Application Priority Data

Aug. 26, 2021 (CN) ......................... 202122034740.5

(51) Int. Cl.
*H01M 10/04* (2006.01)
*H01M 4/04* (2006.01)

(52) U.S. Cl.
CPC ...... *H01M 10/0404* (2013.01); *H01M 4/0419* (2013.01); *H01M 4/0435* (2013.01); *H01M 4/0471* (2013.01)

(58) Field of Classification Search
CPC ................................................ H01M 10/0404
See application file for complete search history.

(56) References Cited

FOREIGN PATENT DOCUMENTS

| | | | |
|---|---|---|---|
| CN | 102680485 | A | 9/2012 |
| CN | 109305586 | A | 2/2019 |
| CN | 110611113 | A | 12/2019 |
| CN | 215578667 | U | 1/2022 |
| JP | H0558544 | A | 3/1993 |
| JP | 2004214089 | A | 7/2004 |
| JP | 2009048936 | A | 3/2009 |
| JP | 2015035355 | A | 2/2015 |
| JP | 2015064956 | A | 4/2015 |

(Continued)

OTHER PUBLICATIONS

WO2014024316translation (Year: 2014).*

(Continued)

*Primary Examiner* — Brian R Ohara
(74) *Attorney, Agent, or Firm* — ANOVA LAW GROUP, PLLC

(57) ABSTRACT

A strip defect repair device configured to repair a coating defect of a strip and includes a detection module, a transfer module, and a repair module. The detection module is configured to detect the coating defect of the strip and feed back a position signal corresponding to the coating defect. The transfer module is configured to respond to the position signal and drive the repair module to move to a position corresponding to the coating defect, and the repair module is configured to add a supplementary material to the coating defect so as to repair the coating defect.

11 Claims, 7 Drawing Sheets

(56) References Cited

FOREIGN PATENT DOCUMENTS

WO 2014024316 A1 2/2014

OTHER PUBLICATIONS

WO2016079821andTranslation (Year: 2016).*

The World Intellectual Property Organization (WIPO) Written Opinion for PCT/CN2022/098229 Sep. 20, 2022 12 Pages (including translation).

The European Patent Office (EPO) The Extended European Search Report for Application No. 22/859,999.9 Sep. 9, 2024 7 Pages.

State Intellectual Property Office of China Notice of Grant of Utility Model Patent Rights for Application No. 202122034740.5 Dec. 24, 2021 2 pages (including translation).

The World Intellectual Property Organization (WIPO) International Search Report for PCT/CN2022/098229 Sep. 20, 2022 7 pages (including English translation).

* cited by examiner 130
132
1323 1324
134
133
B
131
1311
1312
A
200

134
130
133
B
131
1311
1312
A
1324 1323 1325
132
200

STRIP DEFECT REPAIR DEVICE

CROSS-REFERENCE TO RELATED APPLICATIONS

The present application is a continuation of PCT/CN2022/098229, filed on Jun. 10, 2022, which claims priority to Chinese patent application no. 202122034740.5, filed on Aug. 26, 2021 and entitled "STRIP DEFECT REPAIR DEVICE", which are incorporated herein by reference in their entirety.

TECHNICAL FIELD

The present application relates to the technical field of battery manufacturing, and in particular, to a strip defect repair device.

BACKGROUND ART

As the new energy vehicle industry is booming, the demand for batteries is rising rapidly, and the consumption of raw materials for batteries is also increasing, so it is very important to reduce cost of the raw materials for batteries.

An electrode plate strip is an important raw material for forming an electrode assembly of a battery. A coating area of the electrode plate strip may have a coating defect. A short circuit may occur in the electrode assembly made of the electrode plate strip having a coating defect, affecting the safety performance of the battery. At present, the electrode plate strip having a coating defect is discarded, resulting in high manufacturing costs of both acceptable electrode plate strips and batteries.

SUMMARY

In accordance with the disclosure, there is provided a strip defect repair device configured to repair a coating defect of a strip. The strip defect repair device includes a detection module configured to detect the coating defect of the strip and feed back a position signal corresponding to the coating defect, a transfer module, and a repair module. The transfer module is configured to respond to the position signal and drive the repair module to move to a position corresponding to the coating defect. The repair module is configured to add a supplementary material to the coating defect so as to repair the coating defect.

BRIEF DESCRIPTION OF THE DRAWINGS

In order to more clearly describe the technical solutions of the embodiments of the present application, the accompanying drawings required in the embodiments will be described briefly below. It should be understood that the following accompanying drawings illustrate only some embodiments of the present application and therefore should not be construed as a limitation on the scope thereof. For those of ordinary skill in the art, other relevant accompanying drawings can also be obtained from these accompanying drawings without any creative effort.

Figure 1:
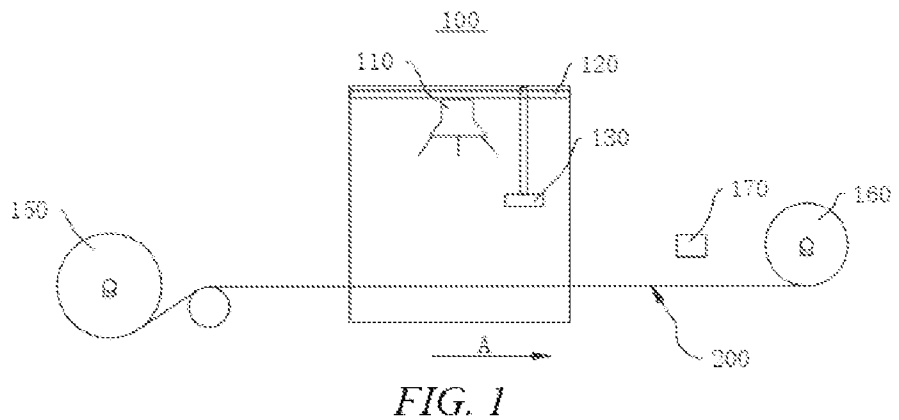
FIG. 1 shows a schematic structural diagram of a front view of a strip defect repair device in a first form in some embodiments of the present application.

The foregoing drawings are not necessarily drawn to scale.

List of reference signs: 100—Strip defect repair device; 110—First detection module; 120—Transfer module; 130—Repair module; 131—Repair mechanism; 1311—Storage bin; 1312—Discharge assembly; 1313—Unwinding assembly; 13131—Unwinding part; 13132—Tension roller; 1314—Cutting assembly; 13141—Clamping part; 13142—Pulling part; 13143—Cutter; 132—Leveling mechanism; 1321—Flattening roller; 1322—Scraper; 1323—Flattening driving member; 1324—Flattening member; 1325—Leveling driving member; 133—Drying mechanism; 134—Mounting plate; 1341—First mounting part; 1342—Second mounting part; 140—Second detection module; 150—Unwinding module; 160—Winding module; 170—Marking module; 180—Slitting module; 200—Strip; 210—Sub-strip.

DETAILED DESCRIPTION OF EMBODIMENTS

In order to make the objectives, technical solutions and advantages of the embodiments of the present application clearer, the technical solutions in the embodiments of the present application will be described clearly below with reference to the drawings in the embodiments of the present application. Obviously, the embodiments described are some of, rather than all of, the embodiments of the present application. All the other embodiments obtained by those of ordinary skill in the art based on the embodiments of the present application without creative efforts shall fall within the scope of protection of the present application.

Unless otherwise defined, all technical and scientific terms used in the present application have the same meanings as those commonly understood by those skilled in the art to which the present application belongs. The terms used in the description of the present application are merely for the purpose of describing specific embodiments, but are not intended to limit the present application. The terms "comprising/including", "provided with", and any variations thereof in the description and claims, as well as the brief description of the drawings described above of the present application are intended to cover non-exclusive inclusions. The terms "first", "second", etc. in the description and the claims of the present application as well as the foregoing drawings are used to distinguish between different objects, rather than describing a specific order or a primary-secondary relationship.

In the present application, the phrase "embodiment" mentioned means that the specific features, structures, or characteristics described with reference to the embodiments can be encompassed in at least one embodiment of the present application. The phrase at various positions in the description does not necessarily refer to the same embodiment, or an independent or alternative embodiment exclusive of another embodiment. Those skilled in the art should understand, in explicit and implicit manners, that an embodiment described in the present application may be combined with another embodiment.

In the description of the present application, it should be noted that, the terms "mount", "connected", "connect", or "attach" should be interpreted in a broad sense unless explicitly defined and limited otherwise. For example, they may be a fixed connection, a detachable connection, or an integral connection; or may be a direct connection, an indirect connection by means of an intermediate medium, or internal communication between two elements. For those of ordinary skills in the art, the specific meaning of the foregoing terms in the present application can be understood according to specific circumstances.

The phrase "a plurality of" appearing in the present application means two or more (including two).

In the present application, a battery cell may include a lithium ion secondary battery, a lithium ion primary battery, a lithium-sulfur battery, a sodium-lithium ion battery, a sodium ion battery, a magnesium ion battery, etc., which will not be limited in the embodiments of the present application. The battery cell may be cylindrical, flat, cuboid or in another shape, which will also not be limited in the embodiments of the present application. The battery cells are generally classified into three types depending on the way of package: cylindrical battery cells, prismatic battery cells and pouch battery cells.

The battery cell includes an electrode assembly and an electrolyte. The electrode assembly is composed of a positive electrode plate, a negative electrode plate and a separator. The battery cell operates mainly by relying on movements of metal ions between the positive electrode plate and the negative electrode plate. The positive electrode plate includes a positive electrode current collector and a positive electrode active material layer. A surface of the positive electrode current collector is coated with the positive electrode active material layer, the positive electrode current collector not coated with the positive electrode active material layer protrudes from the positive electrode current collector coated with the positive electrode active material layer, and the positive electrode current collector not coated with the positive electrode active material layer serves as a positive tab. Taking a lithium ion battery as an example, the positive electrode current collector may be made of aluminum, and the positive electrode active material may be lithium cobalt oxide, lithium iron phosphate, ternary lithium, lithium manganate, etc. The negative electrode plate comprises a negative electrode current collector and a negative electrode active material layer. A surface of the negative electrode current collector is coated with the negative electrode active material layer, the negative electrode current collector that is not coated with the negative electrode active material layer protrudes from the negative electrode current collector coated with the negative electrode active material layer, and the negative electrode current collector that is not coated with the negative electrode active material layer is used as a negative electrode tab. The negative electrode current collector may be made of copper, and the negative electrode active material may be carbon, silicon, etc. In order to ensure that no fusing occurs when a large current passes, there are a plurality of positive electrode tabs which are stacked together, and there are a plurality of negative electrode tabs which are stacked together. The separator may be made of polypropylene (PP), polyethylene (PE), etc. In addition, the electrode assembly may be of a wound structure or a laminated structure, which will not be limited in the embodiments of the present application.

In a manufacturing process of an electrode plate strip, it is necessary to coat a surface of a current collector with an active material to form a coating area, and then to form the electrode plate strip having the coating area through cold pressing and drying. The inventors have found that bubbles mixed in the active material, foreign matter on a surface of a pressing roller during cold pressing and an improper drying temperature during drying may all lead to an insufficient coating thickness or no active material coverage of part of the coating area, resulting in a coating defect. If the electrode plate strip having a coating defect is used to form an electrode assembly, a positive electrode current collector of the electrode assembly may come into contact with a negative electrode current collector, resulting in short circuit occurring in a battery cell. At present, electrode plate strips having coating defects are mainly scrapped, such that losses of material costs and equipment productivity are caused, and the production cost of electrode plate strips is increased.

Based on the foregoing solution, the present application provides a coating defect repair device, which can detect a coating defect of an electrode plate strip and repair the coating defect already formed. A successfully repaired electrode plate strip may be used as an acceptable strip, such that a scrap rate of the electrode plate strip is reduced, and the manufacturing cost of the acceptable strip and therefore of the electrode assembly and the battery cell is decreased.

FIG. 1 shows a schematic structural diagram of a front view of a strip defect repair device in a first form in some embodiments of the present application.

As shown in FIG. 1, a strip defect repair device 100 includes an unwinding module 150 and a winding module 160, a strip 200 travels in a preset direction A, two ends of the strip 200 are connected to the unwinding module 150 and the winding module 160 respectively, the unwinding module 150 is configured to unwind the strip 200 to be subjected to coating defect detection and defect repairing, and the winding module 160 is configured to wind up the strip 200 after defect repairing.

The strip defect repair device 100 includes a first detection module 110, a transfer module 120 and a repair module 130. The first detection module 110 is configured to detect a coating defect of the strip 200 and feed back a position signal corresponding to the coating defect, the transfer module 120 is configured to respond to the position signal and drive the repair module 130 to move to a position corresponding to the coating defect, and the repair module 130 is configured to add a supplementary material to the coating defect so as to repair the coating defect.

It may be understood that a coating defect of an electrode plate strip means that a coating area has a local coating thickness smaller than a normal thickness; or a coating area is locally coated with no active material such that a current collector is exposed; or two connected electrode plate strips are bonded by an adhesive tape, and a connection gap exists at a joint of the two electrode plate strips.

The strip 200 to which the strip defect repair device 100 is applicable may be an electrode plate strip for forming an electrode assembly, or other types of strips, which will not be further limited herein.

The supplementary material may have the same material as the coating area. A coating material is added to the coating defect, so as to repair the coating defect. Alternatively, the supplementary material may have a different material from the coating area. The supplementary material is an insulation adhesive, so as to prevent the current collector from being exposed and short-circuited with an electrode plate of the other polarity after the electrode assembly is formed.

The first detection module 110 may be configured to detect the coating defect of the strip 200 and feed back the position signal corresponding to the coating defect, and to further detect whether the repaired coating defect is acceptable while detecting whether the strip 200 has a coating defect. The first detection module 110 may be a charge coupled device (CCD) camera, which detects a color difference to identify whether the strip 200 has a coating defect. Alternatively, the first detection module 110 may be a distance measuring sensor, which detects a coating thickness to identify whether the strip 200 has a coating defect.

The transfer module 120 may be a three-line driving mechanism or a six-axis manipulator. The transfer module 120 may respond to a detection result of the first detection module 110 and drive the repair module 130 to reach the position corresponding to the coating defect, or may reach an area corresponding to the coating defect before responding to the first detection module 110, so that the repair efficiency of the coating defect is improved.

The first detection module 110 detects whether the strip has a coating defect and feeds back the position signal corresponding to the coating defect, the transfer module 120 drives the repair module 130 to move to the position corresponding to the coating defect, and the repair module 130 adds the supplementary material to the coating defect at a position where the coating defect is located, so as to repair the coating defect, such that a scrap rate of the strip 200 can be reduced, and then manufacturing cost of the electrode assembly and the battery cell can be decreased.

Figure 2:
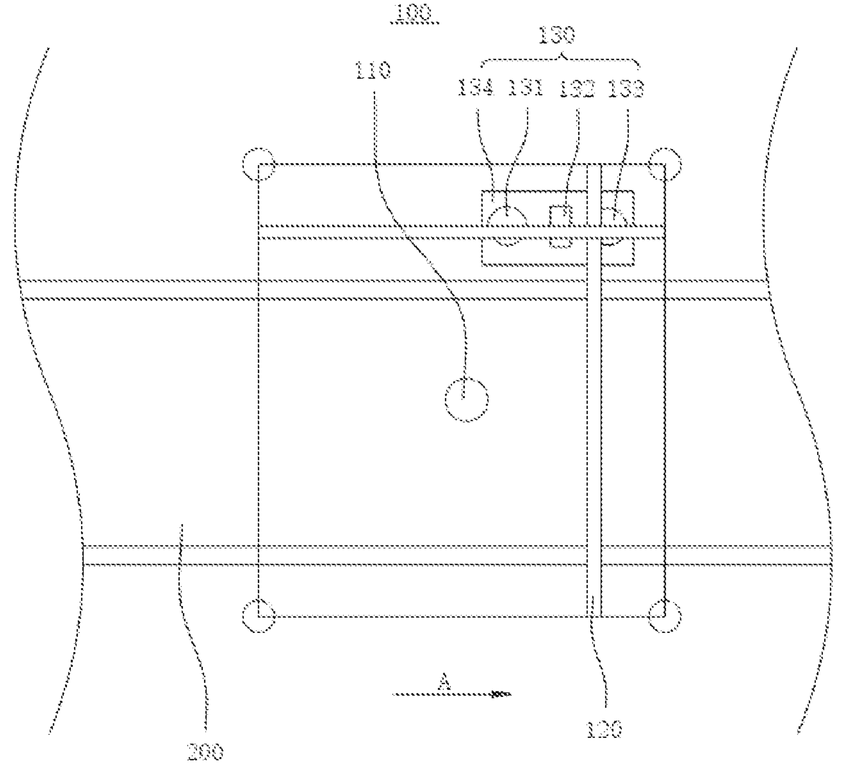
FIG. 2 shows a schematic structural diagram of a top view of a coating defect repair device in some embodiments of the present application.

FIG. 2 shows a schematic structural diagram of a top view of a coating defect repair device in some embodiments of the present application.

As shown in FIG. 2, the repair module 130 includes a repair mechanism 131 and a leveling mechanism 132. The repair mechanism 131 is configured to add a supplementary material to the coating defect, and the leveling mechanism 132 is configured to level the supplementary material added to the coating defect.

Specifically, the repair module 130 further includes a mounting plate 134. The mounting plate 134 is mounted on an execution end of a transfer module 120, and the repair mechanism 131 and the leveling mechanism 132 are both mounted on the mounting plate 134.

The repair module 130 may repair a spot-shaped or elongated coating defect. For different types of coating defects, the repair mechanism 131 and the leveling mechanism 132 may have different structures.

The repair mechanism 131 is used to add the supplementary material to the coating defect, and the leveling mechanism 132 is used to level the supplementary material added to the coating defect, such that the supplementary material fills the coating defect and is flush with a surface of the strip 200.

FIGS. 3-9 show schematic structural diagrams of a repair module in several forms in some embodiments of the present application.

Figure 3:
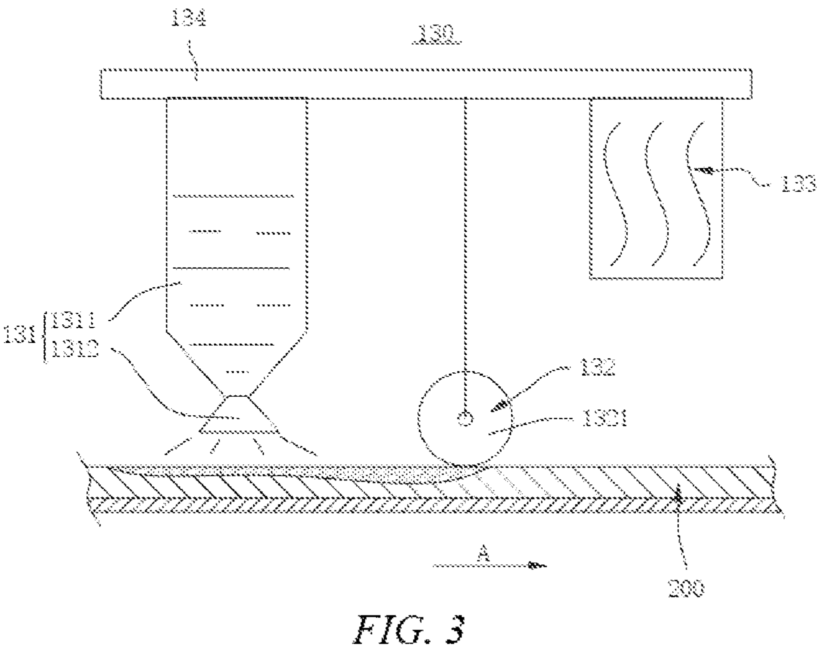
FIG. 3 shows a schematic structural diagram of a repair module in a first form in some embodiments of the present application.
Figure 4:
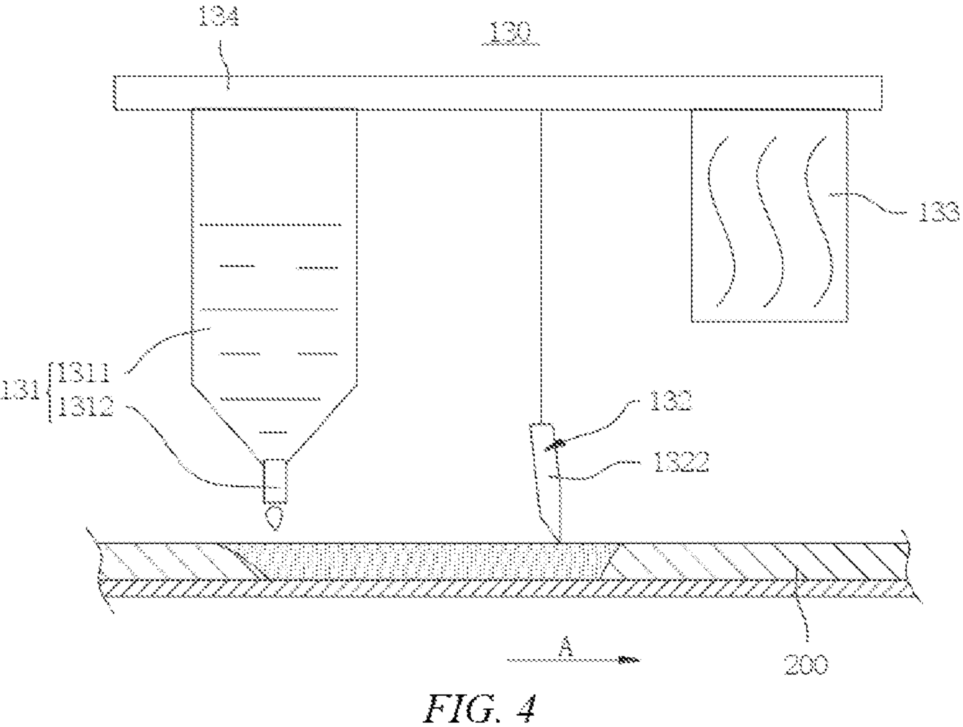
FIG. 4 shows a schematic structural diagram of a repair module in a second form in some embodiments of the present application.

As shown in FIGS. 3 and 4, in some embodiments of the present application, the supplementary material is slurry, and the repair mechanism 131 includes a storage bin 1311 and a discharge assembly 1312. The storage bin 1311 is configured to store the supplementary material, the discharge assembly 1312 is in communication with the storage bin 1311, and the discharge assembly 1312 is configured to add the supplementary material to the coating defect.

It may be understood that in a coating process of an active material, if bubbles are mixed in the active material, a spot-shaped coating defect may be formed, the coating defect may have a smaller thickness than other parts of a coating area, or a surface of a current collector may be exposed. For this type of coating defect, a supplementary material having a high fluidity may be used to repair the coating defect.

Specifically, the storage bin 1311 is mounted on a mounting plate 134, a lower end of the storage bin 1311 is provided with an opening, the discharge assembly 1312 is mounted to the opening and in communication with the storage bin 1311, the supplementary material stored in the storage bin 1311 is discharged from the discharge assembly 1312 under the action of gravity, and the discharge assembly 1312 may be an adhesive spraying nozzle or a adhesive dripping nozzle.

As shown in FIG. 3, the discharge assembly 1312 is an adhesive spraying nozzle suitable for repairing a small coating defect where the coating has a smaller thickness. The adhesive spraying nozzle sprays a supplementary material in a slurry state to the coating defect, and is applicable to a coating defect where the coating has an insufficient thickness.

As shown in FIG. 4, the discharge assembly 1312 is an adhesive dripping nozzle suitable for repairing a small coating defect where a surface of a current collector is exposed. The adhesive dripping nozzle adds a drop-shaped supplementary material in a slurry form to the coating defect, and is applicable to a coating defect where no coating exists and the surface of the current collector is exposed.

The supplementary material in a slurry form is added to the coating defect, and flow of the supplementary material is promoted through rolling, scraping, etc., such that the supplementary material fills the coating defect, and a surface of the supplementary material is flush with the coating area.

Figure 5:
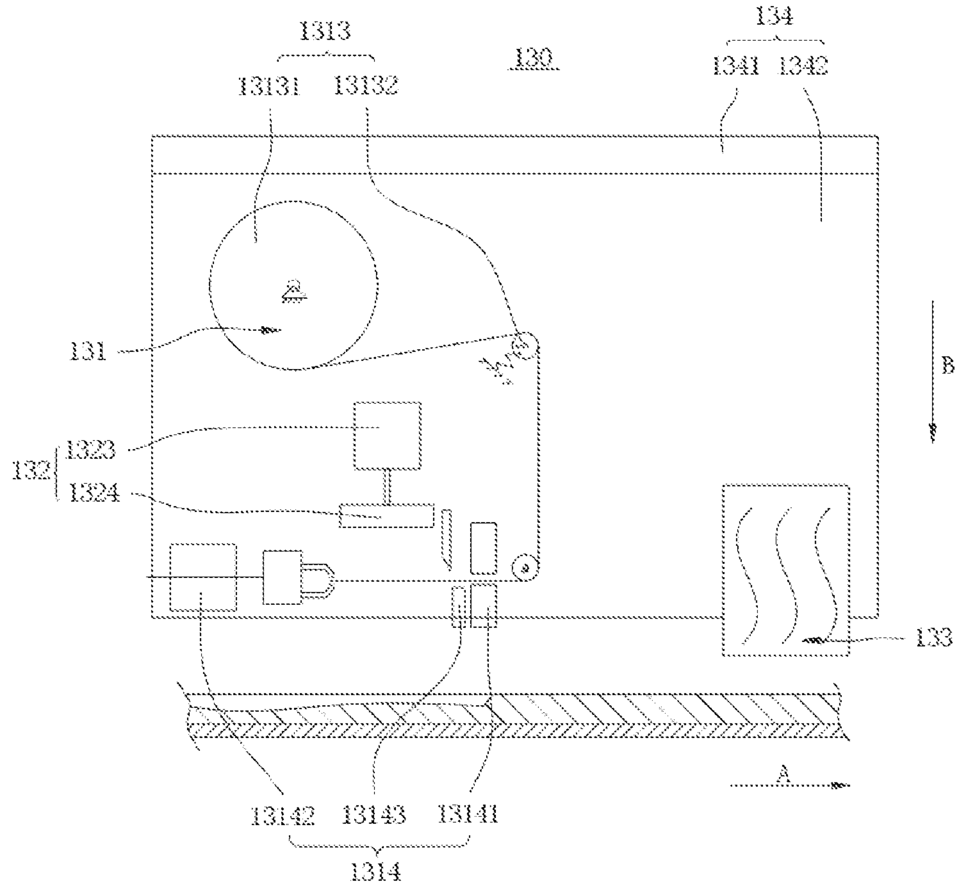
FIGS. 5 and 6 show schematic structural diagrams of a repair module in a third form in two states in some embodiments of the present application, respectively.
Figure 6:
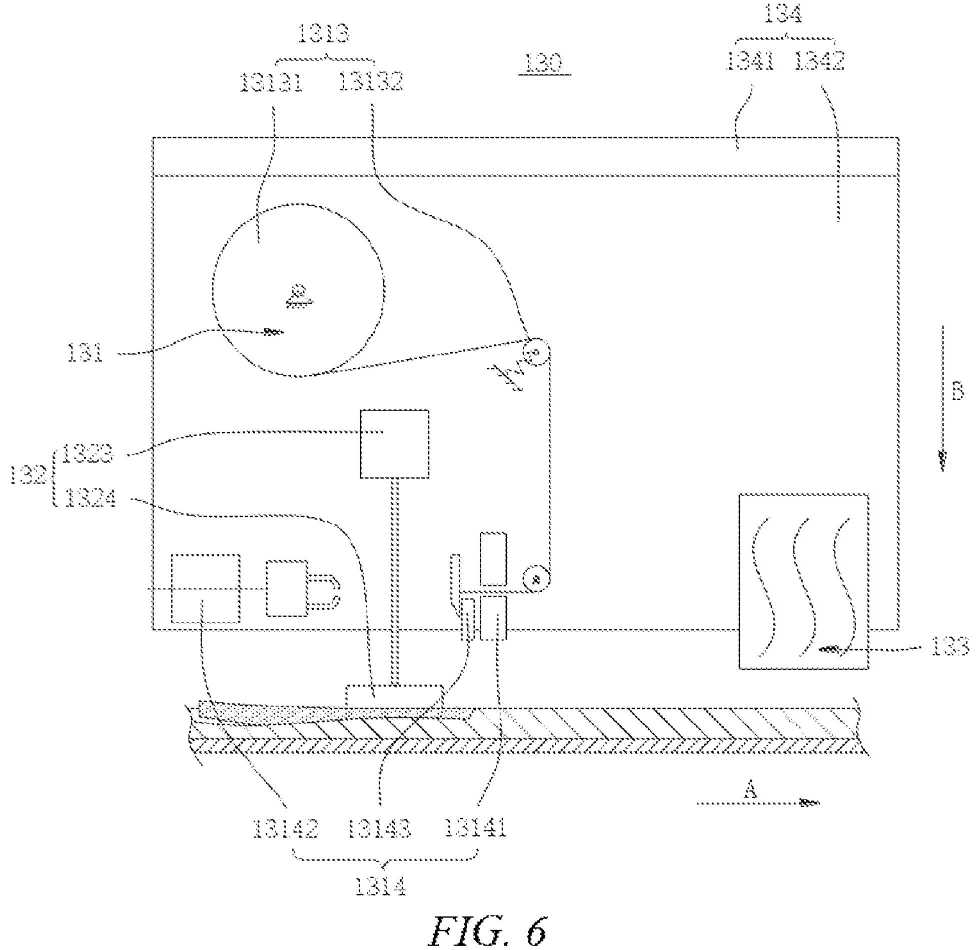

As shown in FIGS. 5 and 6, in some embodiments of the present application, the supplementary material is a strip-shaped material, and the repair mechanism 131 includes an unwinding assembly 1313 and a cutting assembly 1314. The unwinding assembly 1313 is configured to unwind the supplementary material, and the cutting assembly 1314 is configured to cut the supplementary material, so as to form a supplementary segment.

It may be understood that foreign matter on a surface of a roller during cold pressing and an improper drying temperature may both lead to an insufficient coating thickness or no active material coverage of part of a coating area, and a coating defect usually extends in a preset direction A and has an elongated shape.

Specifically, the mounting plate 134 includes a first mounting part 1341 and a second mounting part 1342. The first mounting part 1341 is connected to the execution end of the transfer module 120, and the second mounting part 1342 is configured to mount the repair module 130. The unwinding assembly 1313 includes an unwinding part 13131 and a number of tension rollers 13132, and the cutting assembly 1314 includes a clamping part 13141, a pulling part 13142 and a cutter 13143. The unwinding part 13131, the tension rollers 13132, the clamping part 13141, the pulling part 13142 and the cutter 13143 are all mounted on the second mounting part 1342, the unwinding part 13131 is configured to store a supplementary material in the form of a roll, and the pulling part 13142 is configured to clamp an end portion of the supplementary material in the form of a roll so as to unwind the supplementary material in the form of a roll. The tension rollers 13132 are arranged between the unwinding part 13131 and the clamping part 13141, so as to tension the supplementary material in the form of a roll. The clamping part 13141 is configured to clamp the supplementary material in the form of a roll, so as to tension the supplementary material to be cut together with the pulling part 13142. The cutter 13143 is arranged between the clamping part 13141 and the pulling part 13142, the cutter 13143 can cut off the supplementary material, and a segment between the cutter 13143 and the pulling part 13142 forms a supplementary segment.

The clamping part 13141 is a pair of clamping jaws for clamping the supplementary material from two sides in a thickness direction of the supplementary material.

The pulling part 13142 includes a retractable driving member and pulling clamping jaws. The retractable driving member is mounted on the second mounting part 1342, the pulling clamping jaws are arranged at an execution end of the retractable driving member, and the retractable driving member can drive the pulling clamping jaws to move in a direction opposite to the preset direction A, so as to unwind the supplementary material under the drive of the pulling clamping jaws.

The strip-shaped supplementary material is added to the coating defect, and the supplementary material is pressed into the coating defect by means of flattening, etc., so as to fill the coating defect, and a surface of the supplementary material is flush with the coating area.

As shown in FIGS. 3, 4, 5 and 6, in some embodiments of the present application, the leveling mechanism 132 includes a flattening roller 1321. Alternatively, the leveling mechanism 132 includes a scraper 1322. Alternatively, the leveling mechanism 132 includes a flattening member 1324 and a flattening driving member 1323. The flattening driving member 1323 is configured to drive the flattening member 1324 to move in a thickness direction of the strip 200, so as to flatten the supplementary material added to the coating defect.

It may be understood that the leveling mechanism 132 may have different specific structures.

As shown in FIG. 3, the leveling mechanism 132 includes a flattening roller 1321. The flattening roller 1321 is mounted on the mounting plate 134, a rotation axis of the flattening roller is parallel to a width direction of the strip 200, and a surface of the flattening roller 1321 is attached to a surface of a coating area of the strip 200, such that the supplementary material protruding from the surface of the strip 200 is rolled to be flush with the surface of the coating area.

As shown in FIG. 4, the leveling mechanism 132 includes a scraper 1322. The scraper 1322 is mounted on the mounting plate 134, a length direction of the scraper 1322 extends in a width direction of the strip 200, and an end portion of the scraper 1322 is attached to a surface of a coating area of the strip 200, such that the supplementary material protruding from the surface of the strip 200 is scraped off, and the supplementary material is flush with the surface of the coating area.

As shown in FIGS. 5 and 6, the leveling mechanism 132 includes a flattening member 1324 and a flattening driving member 1323. The flattening driving member 1323 is configured to drive the flattening member 1324 to move in a thickness direction B of the strip 200, so as to flatten the supplementary material added to the coating defect. By means of the foregoing structure, a supplementary segment may be added to the coating defect, and the supplementary material is pressed, such that the supplementary segment fills the coating defect and is flush with the surface of the coating area, which is suitable for repairing an elongated coating defect.

Repair mechanisms 131 of various forms and leveling mechanisms 132 of various forms may be combined to form repair modules 130 of various forms.

As shown in FIGS. 3 and 4, for example, in the foregoing embodiment where the repair mechanism 131 includes a storage bin 1311 and a discharge assembly 1312, the leveling mechanism 132 may include a flattening roller 1321 or a scraper 1322. The repair mechanism 131 discharges the supplementary material in a slurry form, and the flattening roller 1321 or the scraper 1322 is used to flatten the supplementary material, such that the supplementary segment fills the coating defect and is flush with the surface of the coating area.

As shown in FIGS. 5 and 6, for example, in the foregoing embodiment where the repair mechanism 131 includes an unwinding assembly 1313 and a cutting assembly 1314, the leveling mechanism 132 may include a flattening member 1324 and a flattening driving member 1323. The repair mechanism 131 forms a supplementary segment through cutting, the supplementary segment falls to the coating defect, and the flattening member 1324 approaches the surface of the strip 200 in the thickness direction B of the strip 200, so as to flatten the supplementary material, such that the supplementary segment fills the coating defect and is flush with the surface of the coating area.

Figure 7:
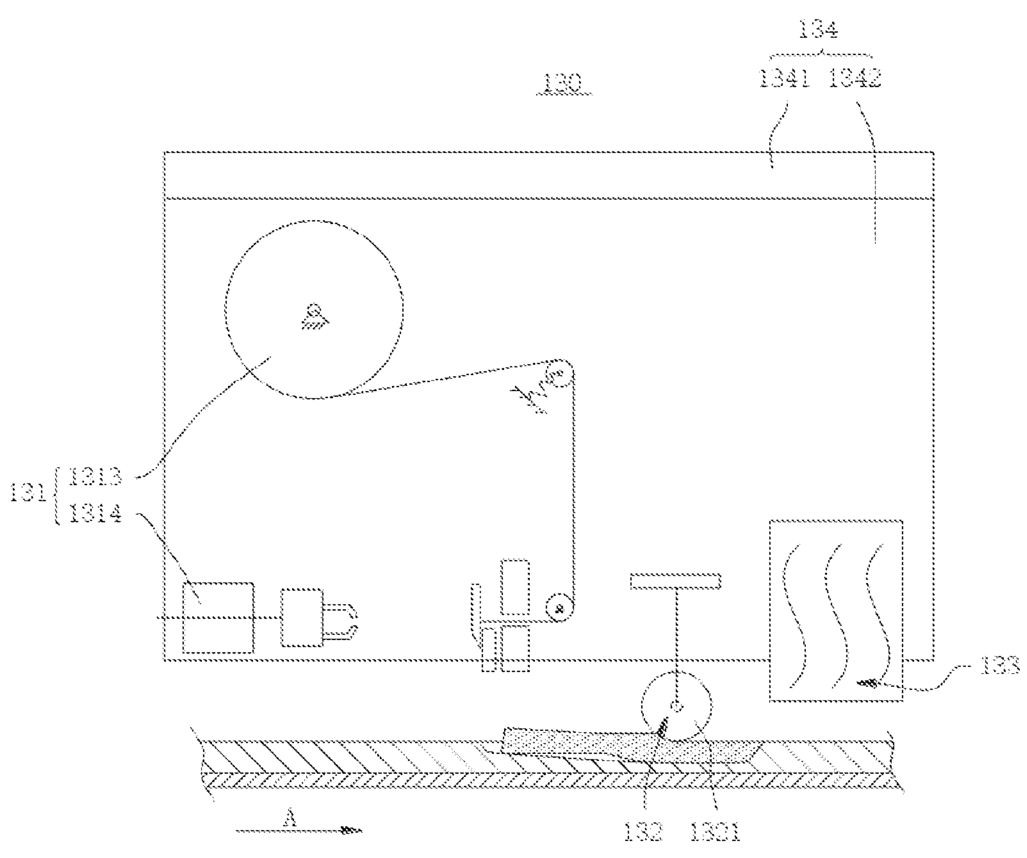
FIG. 7 shows a schematic structural diagram of a repair module in a fourth form in some embodiments of the present application.

As shown in FIG. 7, for example, in the embodiment where the repair mechanism 131 includes an unwinding assembly 1313 and a cutting assembly 1314, the leveling mechanism 132 may include a flattening roller 1321 or a scraper (not shown in the figure). The repair mechanism 131 forms a supplementary segment through cutting, the supplementary segment falls to the coating defect, and the flattening roller 1321 or the scraper (not shown in the figure) presses the supplementary segment into the coating defect, such that the supplementary segment fills the coating defect and is flush with the surface of the coating area.

Figures 8, 9:
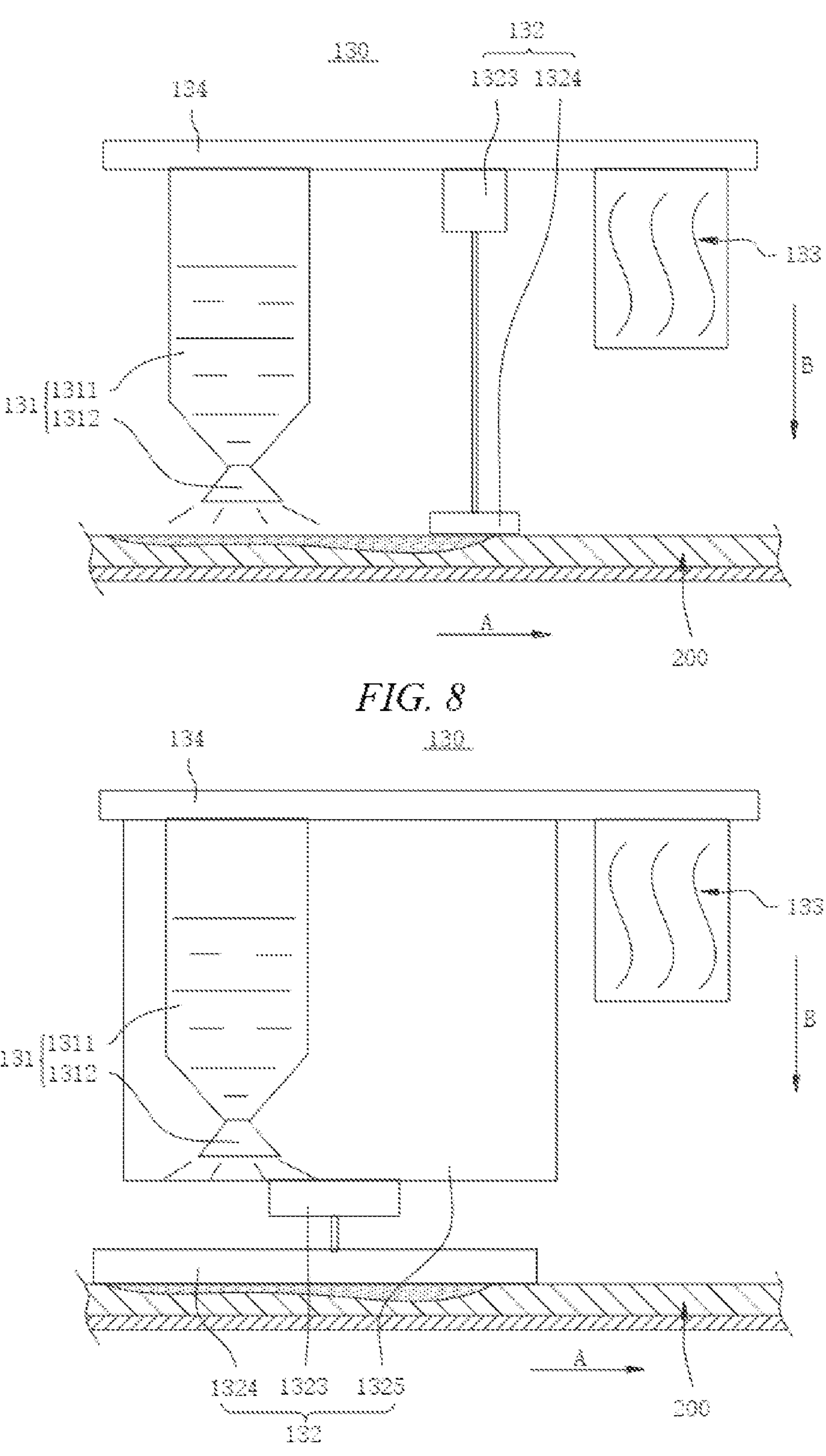
FIG. 8 shows a schematic structural diagram of a repair module in a fifth form in some embodiments of the present application.
FIG. 9 shows a schematic structural diagram of a repair module in a sixth form in some embodiments of the present application.

As shown in FIG. 8, for another example, in the embodiment where the repair mechanism 131 includes a storage bin 1311 and a discharge assembly 1312, the leveling mechanism 132 includes a flattening member 1324 and a flattening driving member 1323. The repair mechanism 131 discharges the supplementary material in a slurry form, and the flattening member 1324 approaches the surface of the strip 200 in the thickness direction B of the strip 200, so as to flatten the supplementary material, such that the supplementary segment fills the coating defect and is flush with the surface of the coating area.

The leveling mechanism 132 of the foregoing structure has a simple structure, and can level the supplementary material added to the coating defect, such that the supplementary material can fill the coating defect and be flush with the surface of the strip 200.

As shown in FIG. 8, in some embodiments of the present application, the repair module 130 further includes a drying mechanism 133 that is configured to dry the supplementary material added to the coating defect.

The drying mechanism 133 may be mounted on a mounting plate 134 and located on the side close to the strip 200. Alternatively, the drying mechanism 133 may be separately fixedly arranged and does not move along with the mounting plate 134.

The drying mechanism 133 can heat the supplementary material after the supplementary material is added to the coating defect, such that the supplementary material completely matches an outline shape of the coating defect, and the supplementary material is integrated with a coating material around the coating defect after fully filling the coating defect and being heated and dried.

In some embodiments of the present application, the drying mechanism 133 includes a heat gun or an infrared lamp.

Specifically, the drying mechanism 133 may include both the heat gun and the infrared lamp, so as to improve the drying efficiency. Alternatively, the drying mechanism 133 may include other forms of heating elements, such as a heating wire.

The drying mechanism 133 of the foregoing structure has a simple structure and low costs, and can dry the supplementary material added to the coating defect.

As shown in FIG. 8, in some embodiments of the present application, the repair mechanism 131, the leveling mechanism 132 and the drying mechanism 133 are arranged in sequence in the preset direction A.

The coating defect passes through the repair mechanism 131, the leveling mechanism 132 and the drying mechanism 133 in sequence while the strip 200 travels in the preset direction A, the repair mechanism 131 adds the supplementary material to the coating defect, the leveling mechanism 132 levels the supplementary material added to the coating defect, and then the drying mechanism 133 heats the supplementary material, such that the supplementary material fully fills the coating defect, and the surface of the supplementary material is flush with the surface of the coating area.

The coating defect of the strip 200 may stop when traveling to a repair position, and the coating defect is repaired in a static state.

As shown in FIG. 9, the leveling mechanism 132 further includes a leveling driving member 1325. The leveling driving member 1325 is mounted on the mounting plate 134, the flattening driving member 1323 is mounted to an execution end of the leveling driving member 1325, and the flattening member 1324 is mounted to an execution end of the flattening driving member 1323. The leveling driving member 1325 can drive the flattening driving member 1323 to move in the preset direction A, such that the flattening member 1324 has a flattening position where it can cover the coating defect and a retracted position where it is clear of a path for the repair mechanism 131 to add the supplementary material to the coating defect. By means of the foregoing structure, the strip 200 travels in the preset direction A, when the repair module 130 reaches a position of the coating defect, the strip 200 stops traveling, the repair mechanism 131 adds the supplementary material to the coating defect, the leveling driving member 1325 drives the flattening driving member 1323 and the flattening member 1324 to move to the flattening position, and the flattening driving member 1323 further drives the flattening member 1324 to approach the surface of the strip 200 in the thickness direction B of the strip 200 until the flattening member is flush with the surface of the coating area of the strip 200, such that the supplementary material fills the coating defect and is flush with the surface of the coating area of the strip 200.

In some embodiments of the present application, the coating defect passes through the repair mechanism 131, the leveling mechanism 132 and the drying mechanism 133 in sequence while the strip 200 travels, such that the coating defect of the strip 200 may be repaired while the strip travels at a low speed, and the repair efficiency and the cycle time are improved.

Figure 10:
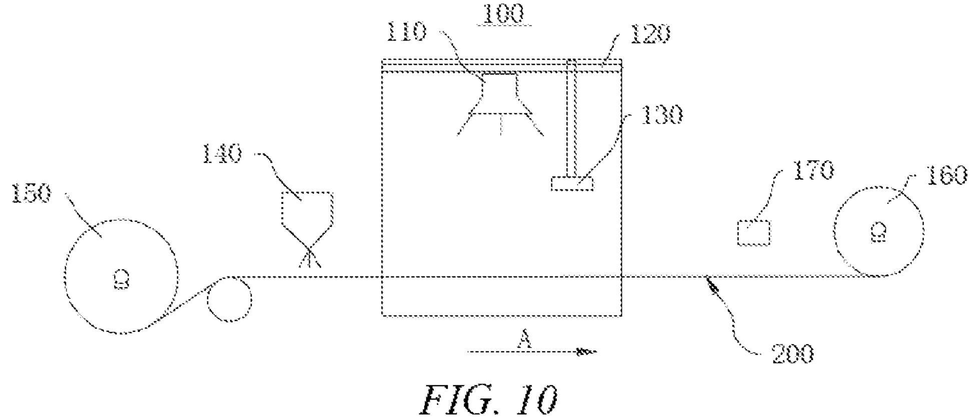
FIG. 10 shows a schematic structural diagram of a front view of a coating defect repair device in a second form in some embodiments of the present application.

FIG. 10 shows a schematic structural diagram of a front view of a coating defect repair device in a second form in some embodiments of the present application.

As shown in FIG. 10, in some embodiments of the present application, the strip defect repair device 100 further includes a second detection module 140. The second detection module 140 is located upstream of the first detection module 110 and the repair module 130, and the second detection module 140 is configured to detect a coating defect of the strip 200 and transmit an area signal corresponding to the coating defect. The transfer module 120 is configured to respond to the area signal and drive the repair module 130 to move to an area corresponding to the coating defect, and then respond to the position signal and drive the repair module 130 to move to the position corresponding to the coating defect.

The second detection module 140 may be a CCD camera, which detects a color difference to identify whether a coating area has a coating defect. Alternatively, the second detection module 140 may be a distance measuring sensor, which detects a coating thickness to identify whether the strip 200 has a coating defect. The second detection module 140 may have a lower detection accuracy than the first detection module 110, so as to reduce the cost. Alternatively, the second detection module 140 may have the same detection accuracy as the first detection module 110, so as to improve the detection accuracy of the second detection module 140.

The second detection module 140 is arranged between the unwinding module 150 and the first detection module 110, the second detection module 140 detects the coating defect of the strip 200 before the first detection module 110 and transmits the corresponding area signal, such that the repair module 130 can move to the corresponding area in advance. When the traveling of the strip 200 drives the coating defect to move to a repair position, the first detection module 110 further performs detection and transmits the position signal corresponding to the coating defect, and the repair module 130 further moves in a small range so as to accurately reach the position corresponding to the coating defect.

The second detection module 140 is arranged upstream of the first detection module 110 and the repair module 130, such that the transfer module 120 can drive the repair module 130 to move in advance, so that the repair module 130 can move to the repair position when the coating defect of the strip 200 reaches the repair position, and the repair efficiency and the cycle time of the coating defect can be improved.

As shown in FIG. 10, in some embodiments of the present application, the first detection module 110 is further configured to detect whether the repaired coating defect is acceptable after the repair module 130 finishes repairing. The strip defect repair device 100 further includes a marking module 170. The marking module 170 is located downstream of the repair module 130, and the marking module 170 is configured to mark the strip 200 when the first detection module 110 detects that the repaired coating defect is unacceptable.

The marking module 170 bonds an adhesive tape or paper that has a different color from the current collector and the coating area of the strip 200 to the surface of the strip 200, and an edge of the adhesive tape or paper extends beyond an edge of the strip 200, such that a worker can identify the strip 200 having an unsuccessfully repaired coating defect. Alternatively, the marking module 170 may mark the surface of the strip 200 with other markers, such as magnetic materials or radioactive materials, so as to cooperate with a corresponding detection module to identify the unsuccessfully repaired strip 200.

The strip 200 after defect repairing is directly marked and wound up. Alternatively, the strip 200 after defect repairing may be slitted first, and then marked and wound up.

Figure 11:
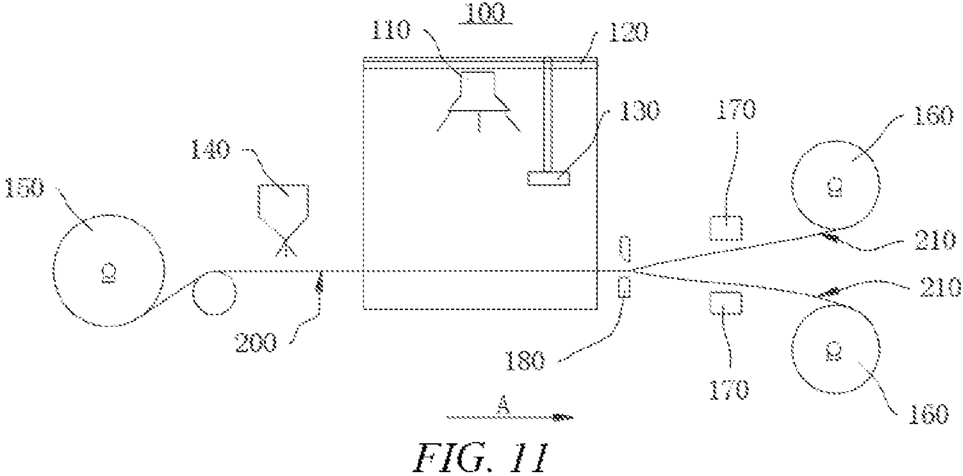
FIG. 11 shows a schematic structural diagram of a front view of a coating defect repair device in a third form in some embodiments of the present application.

FIG. 11 shows a schematic structural diagram of a front view of a coating defect repair device in a third form in some embodiments of the present application.

As shown in FIG. 11, the strip defect repair device 100 further includes a slitting module 180. The slitting module 180 is arranged behind the repair module 130 and is configured to slit the strip 200 after defect repairing, so as to form two sub-strips 210, and each sub-strip 210 corresponds to a marking module 170 and a winding module 160. By means of the structure, the first detection module 110 may be used to detect whether the defect repairing is acceptable, and to further determine which one of the sub-strips 210 formed after slitting has an unsuccessfully repaired coating defect or that the two sub-strips 210 each have an unsuccessfully repaired coating defect, the sub-strip 210 having an unsuccessfully repaired coating defect is marked, and the sub-strip 210 having no coating defect or having a successfully repaired coating defect is wound up and unloaded as an acceptable sub-strip 210.

After the coating defect is repaired, whether the repaired coating defect is acceptable is detected again, and the unacceptable repaired coating defect is marked, so that whether the coating defect is repaired successfully can be further detected, and the strip 200 having an unsuccessfully repaired coating defect is identified for scrapping.

As shown in FIGS. 2 and 11, some embodiments of the present application provide a strip defect repair device 100 including an unwinding module 150, a second detection module 140, a repair station, a slitting module 180 and two winding sub-stations behind the slitting module, which are arranged in sequence in the preset direction A. Each winding sub-station includes a marking module 170 and a winding module 160. The repair station includes a first detection module 110, a transfer module 120, and a repair module 130. When an electrode plate strip passes through the repair station, a coating defect may be repaired and whether the repaired coating defect is acceptable may be detected. The electrode plate strip is unwound by the unwinding module 150, and a coating defect may exist on the electrode plate strip. When the coating defect passes through the second detection module 140 while the electrode plate strip travels, the second detection module 140 detects the existence of a coating defect through color difference comparison, and detects an area corresponding to the coating defect. The transfer module 120 responds and moves the repair module 130 to the area corresponding to the time when the coating defect reaches the repair station. When the coating defect reaches the repair station, the first detection module 110 detects a position corresponding to the coating defect through color difference comparison, and the transfer module 120 responds and moves the repair module 130 to an accurate position of the coating defect. The electrode plate strip continues to travel to pass through a repair mechanism 131, a leveling mechanism 132 and a drying mechanism 133 in sequence. The repair mechanism 131 adds a supplementary material to the coating defect, the leveling mechanism 132 levels the supplementary material, and the drying mechanism 133 heats the supplementary material, so as to complete the repairing of the coating defect. The first detection module 110 detects whether a color difference ratio between the repaired coating defect and other areas of the coating area is smaller than a preset value through color difference comparison again, and determines whether the coating defect is successfully repaired at the repair station. If the color difference ratio is greater than the preset value, it is determined that the coating defect is unsuccessfully repaired, and the unsuccessfully repaired coating defect belongs to one or both of the sub-strips 210 is determined. When the corresponding sub-strip 210 passes through the marking module 170, the marking module 170 bonds a marking bar to the sub-strip 210 having an unsuccessfully repaired coating defect, and an end portion of the marking bar is exposed from an edge of the sub-strip 210 in the width direction. The winding modules 160 wind up the two sub-strips 210, and whether the sub-strips 210 have the color of the marking bar is detected by the worker or through intelligent identification. If a sub-strip 210 is bonded with a marking bar, it can be determined that the sub-strip 210 is a waste material and needs to be scrapped. The sub-strip 210 having no marking bar is discharged as an acceptable strip.

The strip defect repair device 100 provided in the embodiments of the present application may be used to repair the coating defect already formed, detect a repair result, and then perform slitting, such that a scrap rate of the electrode plate strip is effectively reduced, the manufacturing cost of the acceptable electrode plate strip is decreased, and the manufacturing cost of the electrode assembly and the battery cell is thus decreased.

It should be noted that the features in the embodiments of the present application may be combined with one another without conflict.

The foregoing is merely illustrative of some embodiments of the present application and is not intended to limit the present application, and various changes and modifications may be made by those skilled in the art. Any modifications, equivalent substitutions, improvements, etc. made within the spirit and principle of the present application should fall within the scope of protection of the present application.

What is claimed is:

1. A strip defect repair device configured to repair a coating defect of a strip, the strip defect repair device comprising:

- a detection module configured to detect the coating defect of the strip and feed back a position signal corresponding to the coating defect;
- a transfer module; and
- a repair module, comprising:
  - a repair mechanism configured to add a supplementary material to the coating defect to repair the coating defect; and
  - a leveling mechanism configured to level the supplementary material added to the coating defect, and comprising:
    - a scraper; or
    - a flattening member and a flattening driving member, the flattening driving member being configured to drive the flattening member to move in a thickness direction of the strip, so as to flatten the supplementary material added to the coating defect;
- wherein:

the transfer module is configured to respond to the position signal and drive the repair module to move to a position corresponding to the coating defect.

2. The strip defect repair device according to claim 1, wherein the supplementary material is slurry, and the repair mechanism comprises:

a storage bin configured to store the supplementary material; and a discharge assembly, wherein the discharge assembly is in communication with the storage bin, and the discharge assembly is configured to add the supplementary material to the coating defect.

3. The strip defect repair device according to claim 1, wherein the supplementary material is a strip-shaped material, and the repair mechanism comprises:

an unwinding assembly configured to unwind the supplementary material; and a cutting assembly configured to cut the supplementary material, so as to form a supplementary segment.

4. The strip defect repair device according to claim 1, wherein the leveling mechanism further comprises:

a flattening roller.

5. The strip defect repair device according to claim 1, wherein the repair module further comprises:

a drying mechanism configured to dry the supplementary material added to the coating defect.

6. The strip defect repair device according to claim 5, wherein the drying mechanism comprises at least one of a heat gun or an infrared lamp.

7. The strip defect repair device according to claim 5, wherein the repair mechanism, the leveling mechanism, and the drying mechanism are arranged in sequence in a traveling direction of the strip.

8. The strip defect repair device according to claim 1, wherein the detection module is a first detection module; the strip defect repair device further comprising:

a second detection module located upstream of the first detection module and the repair module, wherein the second detection module is configured to detect the coating defect of the strip and transmit an area signal corresponding to the coating defect;

wherein the transfer module is configured to respond to the area signal and drive the repair module to move to an area corresponding to the coating defect, and then respond to the position signal and drive the repair module to move to the position corresponding to the coating defect.

9. The strip defect repair device according to claim 1, further comprising:

a marking module located downstream of the repair module;

wherein:

the detection module is further configured to detect whether a repaired coating defect is acceptable; and the marking module is configured to mark the strip in response to the detection module detects that the repaired coating defect is unacceptable.

10. A strip defect repair device configured to repair a coating defect of a strip, the strip defect repair device comprising:

a detection module configured to detect the coating defect of the strip and feed back a position signal corresponding to the coating defect;

a transfer module; and a repair module, comprising:

a repair mechanism configured to add a supplementary material to the coating defect to repair the coating defect; and a leveling mechanism configured to level the supplementary material added to the coating defect;

wherein:

the transfer module is configured to respond to the position signal and drive the repair module to move to a position corresponding to the coating defect; and the supplementary material is a strip-shaped material, and the repair mechanism comprises:

an unwinding assembly configured to unwind the supplementary material; and a cutting assembly configured to cut the supplementary material, so as to form a supplementary segment.

11. A strip defect repair device configured to repair a coating defect of a strip, the strip defect repair device comprising:

a detection module configured to detect the coating defect of the strip and feed back a position signal corresponding to the coating defect;

a transfer module; and a repair module, comprising:

a repair mechanism configured to add a supplementary material to the coating defect to repair the coating defect;

a leveling mechanism configured to level the supplementary material added to the coating defect; and a heat gun configured to dry the supplementary material added to the coating defect;

wherein the transfer module is configured to respond to the position signal and drive the repair module to move to a position corresponding to the coating defect.

* * * * *